United States Patent [19]

Das

[11] Patent Number: 4,789,593

[45] Date of Patent: * Dec. 6, 1988

[54] GLASS FIBERS WITH FAST WETTABILITY AND METHOD OF PRODUCING SAME

[75] Inventor: Balbhadra Das, Allison Park, Pa.

[73] Assignee: PPG Industries, Inc., Pittsburgh, Pa.

[*] Notice: The portion of the term of this patent subsequent to Jun. 21, 2005 has been disclaimed.

[21] Appl. No.: 39,812

[22] Filed: Apr. 13, 1987

Related U.S. Application Data

[62] Division of Ser. No. 748,388, Jun. 25, 1985, abandoned.

[51] Int. Cl.$^4$ .......................... B32B 9/00; D02G 3/00
[52] U.S. Cl. .................................... 428/391; 428/375; 428/378; 428/379; 428/392
[58] Field of Search ............... 428/379, 378, 415, 375, 428/391, 392

[56] References Cited

U.S. PATENT DOCUMENTS

| | | | |
|---|---|---|---|
| 3,473,950 | 10/1969 | Wong | 428/375 |
| 3,969,299 | 7/1976 | Burns et al. | 428/268 |
| 4,110,094 | 8/1978 | Motsinger | 427/314 |
| 4,219,457 | 8/1980 | Taniguchi et al. | 428/375 |
| 4,295,871 | 10/1981 | Droux et al. | 428/378 |
| 4,330,444 | 5/1982 | Pollman | 428/378 |
| 4,347,278 | 8/1982 | Flautt et al. | 428/391 |
| 4,436,848 | 3/1984 | Haines et al. | 428/378 |
| 4,448,910 | 5/1984 | Haines et al. | 428/378 |
| 4,448,911 | 5/1984 | Haines et al. | 428/378 |
| 4,457,785 | 7/1984 | Hsu et al. | 162/156 |
| 4,461,804 | 7/1984 | Motsinger et al. | 428/378 |
| 4,518,653 | 5/1985 | McWilliams et al. | 428/378 |

FOREIGN PATENT DOCUMENTS 850726 9/1970 Canada.
2077275 12/1981 United Kingdom.

OTHER PUBLICATIONS

Technical Leaflet from Savid Chemical Co., Como, Italy, pp. 14–22, 40.
The Model 1700 Series FTIR Spectrometers, Perkin–Elmer.

Primary Examiner—Sharon A. Gibson
Attorney, Agent, or Firm—Kenneth J. Stachel

[57] ABSTRACT

Fast controlled wettability of glass fibers in a polymeric matrix is achieved by controlling the amount of unsaturation in the components of the chemical treatment present on the glass fibers. Glass fibers treated with an aqueous chemical treating composition having a polar thermoplastic film forming polymer, coupling agent and lubricant have these components with an amount of aliphatic unsaturation of less than 1.5 double bonds per mole of polymer or compound and a ratio of aliphatic unsaturation to aromatic unsaturation of not greater than 0.1. For the polar thermoplastic film forming polymer, the viscosity of the polymer is less than 10,000 centipoise and the aliphatic unsaturation can be controlled by limiting the amount of unsaturation on the monomer and also controlling the amount of solvent used in emulsifying the polymer in water. Also the components of the aqueous chemical treating composition have limited amounts of any component which is chain extension inducing or condensation reaction inducing.

10 Claims, 3 Drawing Sheets

GLASS FIBERS WITH FAST WETTABILITY AND METHOD OF PRODUCING SAME

This application is a division of application Ser. No. 748,388, filed June 25, 1985, now abandoned The present invention is directed to glass fibers treated with an aqueous chemical treating composition to produce fast wettable glass fibers for polymeric matrices and the method of producing said glass fibers.

The reinforced plastics industry has been using glass fibers in various forms for reinforcing polymeric matrices to produce myriad products. For instance, glass fibers have been used in the forms of continuous and chopped filaments and strands and mats and rovings and woven and nonwoven fabrics and needled mats to reinforce polymers. Thermoplastic polymeric matrices have been reinforced with the various form of glass fibers in producing such products as injection molding products, spray-up molding products and the like molding products.

In producing glass fibers for polymeric reinforcement, the glass fibers are attenuated from molten streams of fiberizable glass material from a bushing or a like device connected to a furnace containing molten fiberizable glass material. The glass fibers are attenuated by a winder, which collects gathered filaments into a package, and/or rollers, which pull the fibers before they are collected and chopped. In the process for producing glass fibers, a chemical treating composition is applied to them shortly after they are attenuated as the molten streams of glass. The chemical treating composition is usually an aqueous composition, which traditionally contains film forming materials, coupling agents and lubricants. The chemical treating composition is needed to retard intrafilament abrasion of the glass fibers, when they are gathered into a bundle of glass fibers or strands and to make the glass fibers compatible with the polymeric matrices that they are to reinforce. Typically, the chemically treated glass fibers are dried either in the package form or in the chopped strand form before they are used for reinforcing polymeric matrices.

The chemically treated glass fibers when used to reinforce polymeric matrices should possess certain characteristics such as good choppability for dispersibility in a matrix polymer, when the glass fibers are used as chopped strand, good solubility in the matrix polymer for fast wettability and low fiber prominence. Various degrees of wettability may be desired in using glass fibers to reinforce polymeric matrices. One example is where there is a desirability to have fast wettability of the glass fibers in a process having fast operating speeds in contacting the glass fibers with the polymer that is to be the matrix of the fiber reinforced polymeric material. Wettability means that the matrix polymer encapsulates the glass fibers and very little, if any, bare glass is visible through the cured fiber reinforced polymeric material. Wettability during production of the glass fiber reinforced polymeric material is a measure of the apparent intimacy of contact between the polymeric matrix and the glass fibers. If the glass fibers are not intimately wet-out following the application of the glass fibers to the polymeric matrix, this may affect adversely the processability, curing characteristics and surface properties of the final cured fiber reinforced polymeric material. For instance, in processing of panels of fiber reinforced polymeric material, the wet-out of the chopped glass fiber strand or bundles of fibers must occur within a short time before the polymeric matrix containing the chopped glass fibers is cured in a processing line. Therefore, the speed of the wet-out of the chopped glass fiber strands or bundles of fibers is an important criteria in producing such products as fiber reinforced panels. Any retardation of the speed of wet-out of the chopped glass fiber strands would not be advantageous in processing panels of fiber reinforced polymeric materials. In some instances, it may not be desirable to have the chemically treated glass fibers wet-out as fast as possible in the polymeric matrix. For instance, in the processing of thermosetting bulk molding compound, the glass fibers are in contact with the polymeric matrix for longer periods of time, and they do not require fast wetting characteristics.

It is the object of the present invention to provide strands of glass fibers which have a high degree of wettability. It is a further object of the present invention to provide a method of producing glass fibers, wherein the wettability of the glass fibers is controlled to have a desired rate of wettability.

SUMMARY OF THE INVENTION

The foregoing objects are accomplished by the glass fiber strands and method of the present invention. The glass fiber strands have glass fibers that are treated with an aqueous chemical treating composition. The aqueous chemical treating composition has an aqueous emulsion of thermoplastic film forming polymer with polar functionality and with an equivalent viscosity of less than 10,000 centipoise, lubricant and coupling agent. The aqueous emulsion of the thermoplastic film forming polymer has an average amount of aliphatic unsaturation of less than around 1.5 aliphatic double bonds/mole of polymer and has a ratio of aliphatic unsaturation to aromatic unsaturation not to exceed 0.1. The ratio is determined by IR absorptivity on film dried at room temperature either by air or under vacuum. Also the value of the ratio of 0.1 is when the polymer has an average amount of 1.5 aliphatic double bonds per mole. In addition, the aqueous chemical treating composition has a low amount of any condensation crosslinking inducing and chain extension inducing reactants. For a slower rate of wetting, the aqueous emulsion of the thermoplastic film forming polymer can have a higher amount of aliphatic unsaturation and a ratio of aliphatic unsaturation to aromatic unsaturation of greater than 0.1 with progressive slower rates of wetting being accomplished with the higher amounts and ratios.

The method of the present invention involves controlling the wettability of the glass fibers, wherein the glass fibers have a dried residue of an aqueous chemical treating composition. The aqueous chemical treating composition has an aqueous emulsion of one or more polar functional film forming polymers, lubricant and coupling agent. The method involves the formulation ofthe aqueous chemical treating composition to have an average amount of aliphatic unsaturation of less than around 1.5 double bonds/mole for each component in the composition to have a ratio of aliphatic unsaturation to aromatic unsaturation of not greater than 0.1 for each component for faster wetting glass fibers and greater than 0.1 for progressively decreasing rates of wettability, and to have for the composition less than 1 weight percent based on the aqueous composition of any chain extension or condensation crosslinking inducing reactants. The method further involves the treatment of the glass fibers with the formulated aqueous chemical treating composition, the collection of the glass fibers and the drying of the glass fibers at conditions to remove moisture and to discourage any crosslinking reactions between the components of the aqueous chemical treating composition.

A BRIEF DESCRIPTION OF THE DRAWINGS

FIG. 1 is a NMR curve for Nexoil 954 material.
FIG. 2 is a NMR curve for Nexoil AO 5620 material.
FIG. 3 is an IR curve of dried film cast from Nexoil AO 5620 material.

DETAILED DESCRIPTION OF THE INVENTION

Aqueous dispersible, or emulsifiable polar functional thermoplastic fim forming polymers include esterified epoxy or epoxidized polyester film forming polymers useful for treating glass fibers. These polymers and others having carboxyl, ester, and other carbonyl, non-charge containing polar groups are well known in the art. These film forming polymers can be internally emulsifiable or dispersible and/or externally emulsified or dispersible by any method known in the art. The internally emulsifiable or dispersible film forming polymers have solubilizable moieties attached to the polymer molecule. For instance, ethylene oxide repeating units can be incorporated into the polymeric chain or unesterified carboxylic groups can be pendant from the chain. In producing these polymeric materials by any method known to those skilled in the art, unsaturation may be introduced into the polymeric chain. Also if organic cosolvents are used with the polar thermoplastic polymers for emulsification or dispersion of the polymers in water, the organic solvent may result in some unsaturation in the emulsified or dispersed system. In utilizing these polymeric film formers in aqueous solutions for treating glass fibers which are to be used to reinforce thermoplastic polymeric matrices, the unsaturation can be detrimental. The aliphatic unsaturation reduces the wettability of the chemically treated glass fibers to polymeric matrices such as saturated and unsaturated polyester matrices.

Figure 1:
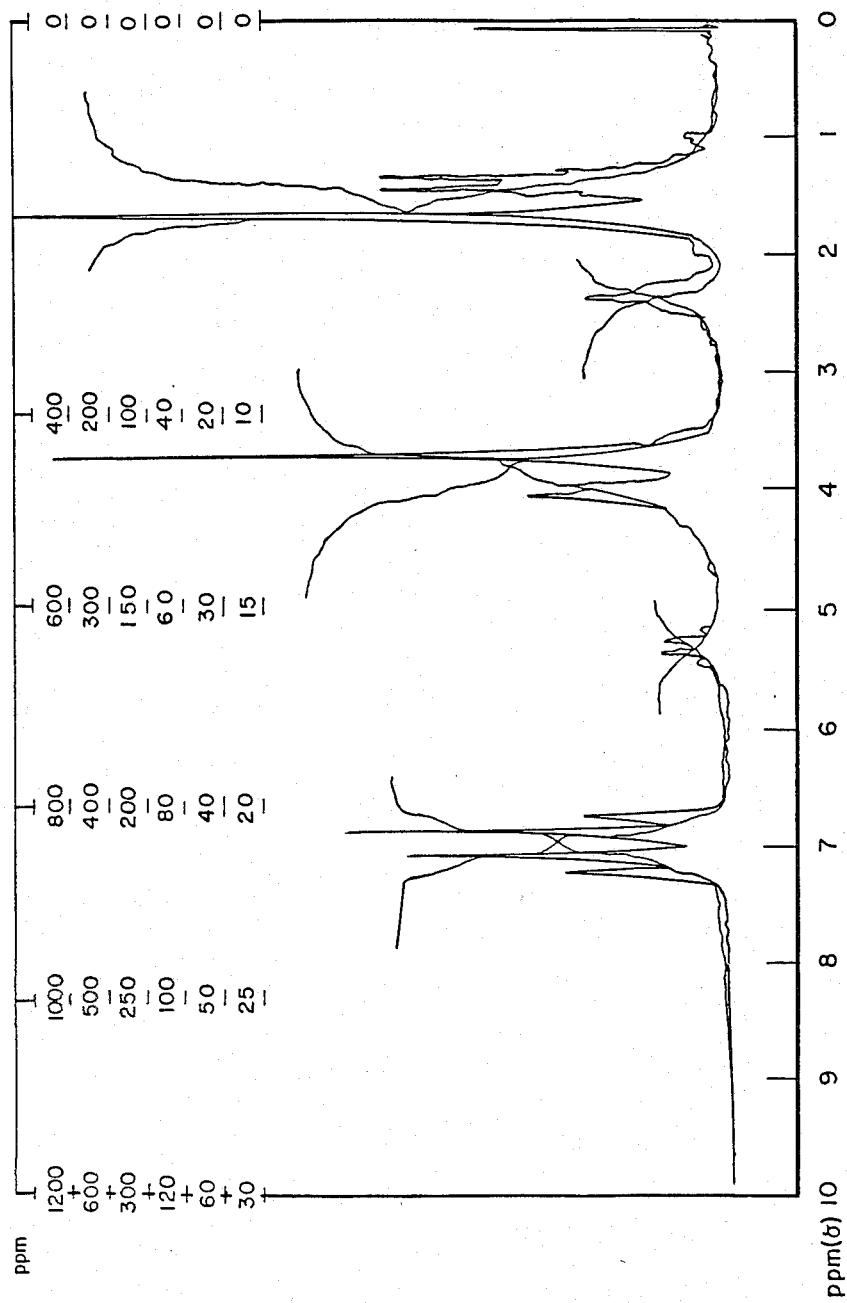

A nonexclusive example of a suitable polar thermoplastic film forming polymer is an aqueous soluble, dispersible or emulsifiable bisphenolic polyester polymer like one formed from bisphenol A, butene diol or maleic anhydride or maleic acid and adipic acid with internal and/or external emulsification through the use of a polyalkylene polyol such as polyethylene glycol. Preferably, the polyester is internally emulsified through ethoxylation for a polymer with a weight average molecular weight in the range of about 30,000 to about 45,000 and has a polydispersity index Mw/Mn of 2 or less. Preferably, this type of bisphenol polyester polymer is the sole film forming polymer in the aqueous chemical treating composition. An example of such a polymer is the single aqueous emulsion of alkoxylated bisphenol polyester resin commercially available under the trade designation Neoxil® 954 and manufactured by Savid, Como, Italy. The properties of the Neoxil® 954 resin are as follows: appearance—milky liquid, solids content—46±3%, pH—3-5, viscosity at 23° C.—2000±500 cps. The aliphatic unsaturation introduced into such a polymer by the butene diol or maleic anhydride or acid should result in aliphatic unsaturation of not more than 1.5 double bonds/mole of polymer. Also the ratio of aliphatic unsaturation to aromatic unsaturation should be less than 0.1 and preferably around 0.07 or less. The amount of aliphatic unsaturation and the ratio can be controlled by any method known to those skilled in the art of polymerization. For example, the amounts of the various monomers can be controlled in the ratio of monomers with and without aliphatic unsaturation. An NMR curve for the Neoxil® 954 resin emulsion is shown in FIG. 1. The NMR was performed on a Varian EM-360 MHz proton NMR Spectrometer with a sweep time of 5 minutes and sweep width of 10 ppm and an end of sweep of 0 ppm and a zero reference of tetramethylsilane (TMS) and an ambient sample temperature and with $DCCL_3$ solvent. The amount of the polar thermoplastic film forming polymer in the aqueous treating composition can be in the range of about 1 to about 20 weight percent of the solids of the aqueous treating composition.

Additional nonexclusive examples of bisphenolic polyester resins are those available in an aqueous emulsion form under the trade designation Neoxil® 952 from Savid. The aqueous emulsion of the Neoxil® 952 material is an anionic emulsion that has a liquid, milky appearance with a solid content of 40±2 percent and a pH in the range of 4 to 5. The viscosity at 23° C. is 40 to 100 centipoise and the lowest pH threshold value of the thinned emulsion (8 percent solids content) is 4. The Neoxil® 952 material is very soluble in styrene and compatible with polyester resins. Another example of the film forming polymer is a high molecular weight saturated epoxy ester which is water soluble, emulsifiable or dispersible. Commercially available high molecular weight saturated epoxy ester in a water emulsion is available from Savid Company under the trade designation Neoxil® 961 material. This material is a nonionic emulsion having a liquid milky appearance and a solids content of 30±2 percent and a pH in the range of 4 to 5.5 with a viscosity at 23° C. of 200 to 500 centipoise and the solid resin has a hydroxyl number of 100±10, an acid number of 10±2 and an epoxy equivalent of 9,000±1,000. Generally, any of the bisphenol type polyester resins which are soluble, emulsifiable or dispersible in water with anionic, nonionic or cationic emulsifiers can be used as long as their amount of unsaturation is not greater than 1.5 and their ratio is less than 0.1. Also, generally, any esterified epoxy resin which is water soluble, emulsifiable or dispersible by anionic, nonionic, or cationic emulsifiers can be used as the polar thermoplastic film forming polymer, where the amount of unsaturation and ratio are controlled. The esterification of epoxy resins can be performed by reaction with carboxylic acids to esterify the epoxy group to form the hydroxy ester, although any other reaction known to those skilled in the art for producing epoxy esters or esterifying epoxy resins can be used.

In producing the aforementioned esterified epoxy resins or epoxidized polyester resins, the starting materials in the process are controlled by any method known to those skilled in the art to produce the film forming polymer with an amount of aliphatic unsaturation of 1.5 double bonds/mole of polymer or less and preferably about 1.14 to 1.4 with a ratio of aliphatic unsaturation to aromatic unsaturation of not greater than 0.1. For instance, the monomer raw materials can be used in such ratios that any unsaturated raw material does not contribute to the polymeric material in such a great extent to increase the ratio over 0.1 or to yield an amount of unsaturation of greater than 1.5.

The method of determining the amount of unsaturation per mole of polymer can be by any method known to those skilled in the art. For example, numerous wet chemical analytical techniques are known, where the double bonds are hydrogenated, halogenated and the like and the uptake of hydrogen or halogen is measured.

The method of determining the ratio can be any method known in the art, but the method preferably involves utilizing a Fourier transform infrared spectraphotometer (FTIR). For a given dried polymer film sample, the absorbance at 1647 reciprocal centimeters is recorded and the absorbance at 1608 reciprocal centimeters is recorded. Then the ratio of the aliphatic unsaturation to the aromatic unsaturation, or the ratio of absorbance at 1647 reciprocal centimeters to that of the absorbance of 1608 reciprocal centimeters is obtained by dividing absorbance at 1647 cm$^{-1}$ by that at 1608 cm$^{-1}$ to give the ratio which should be less than 0.1 and preferably less than 0.07. This approach determines the relative degree of alkene unsaturation in each film by obtaining the absorbance at 1647 cm$^{-1}$ and dividing this absorbance by that absorbance associated with C=C in plane vibration of aromatic structures. It is preferred in obtaining the absorbance values at the designated wave lengths that the values are used from the FTIR's data station and not interpalated from the charts. When other techniques are used to determine the ratio the value of the ratio may be other than 0.1. As long as this other value for the ratio is equivalent to the 0.1 or less value as achieved by the FTIR method, the benefits of the present invention can be achieved.

The aqueous chemical treating composition should not have any other components that are outside the range of amounts for aliphatic unsaturation and the range of values for the ratio of aliphatic unsaturation to aromatic unsaturation. Each additional compound in the aqueous chemical treating composition should have an aliphatic unsaturation of less than 1.5 double bonds/mole of compound. Also the ratio for each compound should not exceed 0.1.

In addition, the aqueous chemical treating composition should not have any large amounts, i.e., greater than 1 weight percent of the aqueous chemical treating composition of polymer chain extending and condensation crosslinking inducing reactants. Preferably the aqueous chemical treating composition is essentially free of these materials. Nonexclusive examples of these materials include catalysts that induce such reactions with the material already present in the treating composition and reactants having moieties such as the following that could undergo condensation reaction:

COOH+NH$_2$

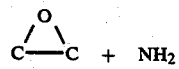

OH+COOH

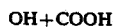

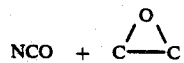

These types of reactions should be kept to a minimum to provide a low crosslink density to promote wettability.

Any saturated and noncondensation reacting material usually found in aqueous chemical treating composition for glass fibers can also be present in the aqueous chemical treatment of the present invention. Nonexclusive examples include various organo silane coupling agents, various lubricants and processing aides. In utilizing these other materials in producing an aqueous chemical treating composition for glass fibers, a certain amount of aliphatic unsaturation can be tolerated as long as it does not take the ratio of aliphatic unsaturation to aromatic unsaturation above 0.1 for the aqueous chemical treating composition.

Examples of particular components that can be utilized to formulate the aqueous chemical treating composition are those having an amount of aliphatic unsaturation of less than around 1.5 double bonds/mole of compound and having a ratio of aliphatic unsaturation to aromatic unsaturation of not greater than 0.1 include: epoxidized polyester film forming polymer, an organo silane coupling agent, a lubricant and an antistatic agent and water. For instance, in addition to the Neoxil ® 954 film forming polymer, the aqueous chemical treating composition can also have epoxy resins produced from aliphatic glycidyl ethers. Also, epoxy resins produced by the reaction of monoepoxy compounds with themselves or other epoxy generating compounds can be used, for example, unsaturated monoepoxy compounds may be homopolymerized through the unsaturation to produce polyepoxy polymer like poly(allyl glycidyl ether). Particularly, suitable epoxy resins are the phenolic epoxies which are obtained by the reaction of a stoichiometric excess of an epihalohydrin such as epichlorohydrin with a polyhydric phenol such as bis(4-hydroxyphenol)-2,2-propane, bis(hydroxyphenyl) methane which is obtained by the acid condensation of two moles of phenol with one mole of formaldehyde, hydroquinone, resorcinol or with polyhydroxy alcohol such as polyalkylene glycols, sorbitol, glycerol and the like. By varying these portions of the epihalohydrin, polyhydroxy compound and/or by varying the reaction conditions, compounds of low, intermediate or higher molecular weights may be produced which range from liquids to solids. Useful commercially available epoxy resins include that available from Shell Chemical Corporation under the trade designation Epon ® 828 epoxy resin, and the epoxies available from Ciba-Geigy under the trade designation Araldite ® resins, and from Dow Chemical Company under the trade designations D.E.R. or D.E.N. resins, and the Epi-Rez ® resins available from Celanese Polymer Specialties Company. A suitable epoxy-containing copolymer which can be used is the epoxidized polyvinyl acetate copolymer available from National Starch under the trade designation 1971 resin.

The aqueous soluble, dispersible or emulsifiable epoxy-containing polymer can have an emulsion or dispersion produced with any suitable surfactant having or not introducing more than the 1.5 double bonds/mole of polymer for aliphatic unsaturation or more than the 0.1 ratio of aliphatic to aromatic unsaturation known to those skilled in the art. For example, epoxy resins produced from aliphatic glycidyl ethers. Also, epoxy resins produced by the reaction of monoepoxy compounds with themselves or other epoxy generating compounds can be used, for example, unsaturated monoepoxy compounds may be homopolymerized through the unsaturation to produce polyepoxy polymer like poly(allyl glycidyl ether). Particularly suitable epoxy resins are the phenolic epoxies which are obtained by the reaction of a stoichiometric excess of an epihalohydrin such as epichlorohydrin with a polyhydric phenol such as bis(4-hydroxyphenol)-2,2-propane, bis(hydroxyphenyl) methane which is obtained by the acid condensation of two moles of phenol with one mole of formaldehyde, hydroquinone, resorcinol or with polyhydroxy alcohol such as polyalkylene glycols, sorbitol, glycerol and the like. By varying these portions of the epihalohydrin, polyhydroxy compound and/or by varying the reaction conditions, compounds of low, intermediate or higher molecular weights may be produced which range from liquids to solids. Useful commercially available epoxy resins include that available from Shell Chemical Corporation under the trade designation Epon® 828 epoxy resin, and the epoxies available from Ciba-Geigy under the trade designation Araldite® resins, and from Dow Chemical Company under the trade designations D.E.R. or D.E.N. resins, and the Epi-Rez® resins available from Celanese Polymer Specialties Company. A suitable epoxy-containing copolymer which can be used is the epoxidized polyvinyl acetate copolymer available from National Starch under the trade designation 1971 resin.

The aqueous soluble, dispersible or emulsifiable epoxy-containing polymer can have an emulsion or dispersion produced with any suitable surfactant known to those skilled in the art. For example, one or more surfactants which are condensates of ethylene oxide with hydrophobic bases formed by condensation with propylene oxide with propylene glycol can be used. For example, the Pluronic ® F-108 surfactant manufactured by BASF Wyandotte Industrial Chemical Group can be used to form a suitable emulsion or dispersion.

In addition to the aqueous soluble, dispersible or emulsifiable film forming polymer, the aqueous treating composition also has present one or more acryloxy-containing or methacryloxy-containing organo-functional coupling agents. The coupling agents can be organofunctional silane coupling agents or organo-functional Werner compounds and the like having on the organofunctional portion of the molecule the following moiety:

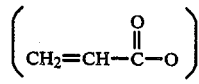

as well as methacryloxy and substituted acryloxy residues such as:

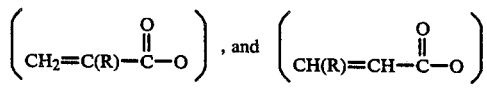

where R is a lower alkyl group having up to 4 carbon atoms. A nonexclusive example of such a coupling agent is methacryloxy alkyl trialkoxy silane. The alkoxy group and the alkyl group have from one to five carbon atoms for the alkyl group. Preferably, the methacryloxyalkyl trialkoxy silane is methacryloxypropyl-trimethoxy silane. The methoxy groups of the methacryloxypropyltrimethoxy silane must be hydrolyzed before the silane is incorporated into the aqueous treating composition. This is accomplished by adding an essentially hydrocarbon organic acid such as acetic acid to the coupling agent and stirring for a sufficient time and at a sufficient temperature to hydrolyze one or more of the SiOCH$_3$ groups to form methanol and one or more SiOH groups. Sufficient water is used in the hydrolysis to impart sufficient activity to the acetic acid. The amount of silane coupling agent used in the aqueous treating composition is an effective coupling amount in the range of about 0.1 to about 10 weight percent of the solids of the aqueous treating composition, where the larger quantities are ordinarily used at controlled humidity conditions.

In addition to the foregoing components of the aqueous chemical treating composition, there is a glass fiber cationic lubricant in an effective lubricating amount. The lubricants are those which impart lubricity to the glass fibers and gathered bundles of glass fibers and strands and which are water soluble cationic materials. Examples include acid solubilized, fatty acid amides such as stearic amide. The fatty acid amides are both saturated and unsaturated and the acid group contains from 4 to 24 carbon atoms. Also, anhydrous acid solubilized polymers of the lower molecular weight unsaturated fatty acid amides are included. Also included are the alkyl imidazolines, which are formed by reaction of fatty acids with polyalkylene polyamines under conditions to produce ring closure. A particularly suitable cationic lubricant is a polyamino amide material having an amine value of about 200 to 800 that is preferably prepared by using fatty acids at least one of which is pelargdnic acid. Also this material can be solubilized further with acetic acid. A nonexclusive example of such a material is the polyalkyleneimine partially amidated with fatty acids like pelargonic acid that is commercially available from Emery Industries, Inc. under the trade designation Emerylube ® 6717. This material is a viscous liquid with a pour point of 55 at 25° C., a density in lbs/gallon of 8.3, a Gardner color of 10, a cloud point of less than 25° C., a flash point of 540° F. (282° C.) and is soluble in water and dispersible in mineral oil. Another suitable material is manufactured under the trade designation Cirrasol® 185A which is an anhydrous material with a deep reddish amber color which is a viscous liquid at room temperature. It is water dispersible and a one percent solution has a pH of about 8.9 to about 9.4. When the cationic water soluble glass fiber lubricant contains a reactable nitrogen group, the effective amount of the lubricant should be limited to substantially prevent any crosslinking of any epoxy-containing polymer that may be present by the nitrogen-containing groups of the glass fiber lubricant. Generally, the effective amount of the glass fiber cationic lubricant is in the range of about 0.05 to about 0.5 weight percent of the aqueous chemical treating composition.

In addition to having chemically treated glass fibers that have desired characteristics for reinforcing polymeric matrices, the treated glass fibers must be processable into the reinforced product. Reinforced plastic panels are produced with chopped strand reinforcement. The glass fibers are produced initially as continuous fibers and they are subsequently chopped. When the fibers or strands or rovings are chopped from dry continuous material, an abundance of static and chopper cling can ruin the processability of the glass fibers for producing the reinforced panels. To overcome any static and assist in reducing chopper cling, the aqueous chemical treating composition has an antistatic agent that is a cationic organic quaternary ammonium salt having alkoxy moieties. Generally, the cationic organic alkoxylated quaternary ammonium salt antistatic agent has a formula such as:

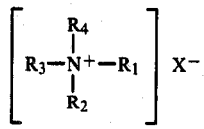

wherein one or more moieties of $R_1$, $R_2$, $R_3$ and $R_4$ can be the same or different alkoxy moieties with or without methylene groups and with a terminal alcoholic group such as:

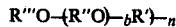

wherein $R'$ is a methylene group ($CH_2$) and n is an integer from 0 to 10 or more; and wherein $R''$ is an ethylene group or propylene group or mixture thereof and b is an integer from 1 to 10 or more; and wherein $R'''$ is hydrogen or a lower alkyl group having one to ten carbon atoms.

When less than four of the groups $R_1$, $R_2$, $R_3$ and $R_4$ are alkoxy groups, the remaining non-alkoxy groups $R_1$, $R_2$, $R_3$ and $R_4$ are alkyl groups having 1 to 30 carbon atoms.

$X^-$ can be any organic or inorganic counter ion such as carboxylic, sulfonate, phosphate and halide ion. This antistatic agent can be produced by any method known in the chemical art for producing quaternary ammonium salts with alkoxy moieties.

Preferably, the cationic organic alkoxylated quaternary ammonium salt antistat has a formula such as

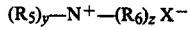

wherein
$R_5$ is the same alkoxy moiety such as:

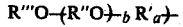

where $R'$ is methylene ($CH_2$) and a is an integer of 1 to 5, and
where $R''$ is ethylene and b is an integer from 2 to 8, and where $R'''$ is hydrogen or a methyl group, and
wherein y is an integer of 3 or 4, and
wherein when y=3 then Z=1 and when y=4 then Z=0, and
wherein $R_6$ is a long chain alkyl having 6 to 25 carbon atoms, and
wherein $X^-$ is $Cl^-$ or $Br^-$, and
wherein preferably the acid number of the material is at least 10.

A nonexclusive example of the cationic organic alkoxylated quaternary ammonium salt antistatic agents include the material commercially available under the trade designation Neoxil ® AO 5620 material available from Savid S.p.A., Como, Italy. This material has the NMR curve of FIG. 2, a molecular weight of 1010 Mn and 1140 Mw, an acid number of 10-20 mgr KOH/p and a pH for 1 percent solution in water of 4-6. The IR of FIG. 3 was obtained from a dried film cast from the Neoxil ® AO 5620 material.

Figure 2:
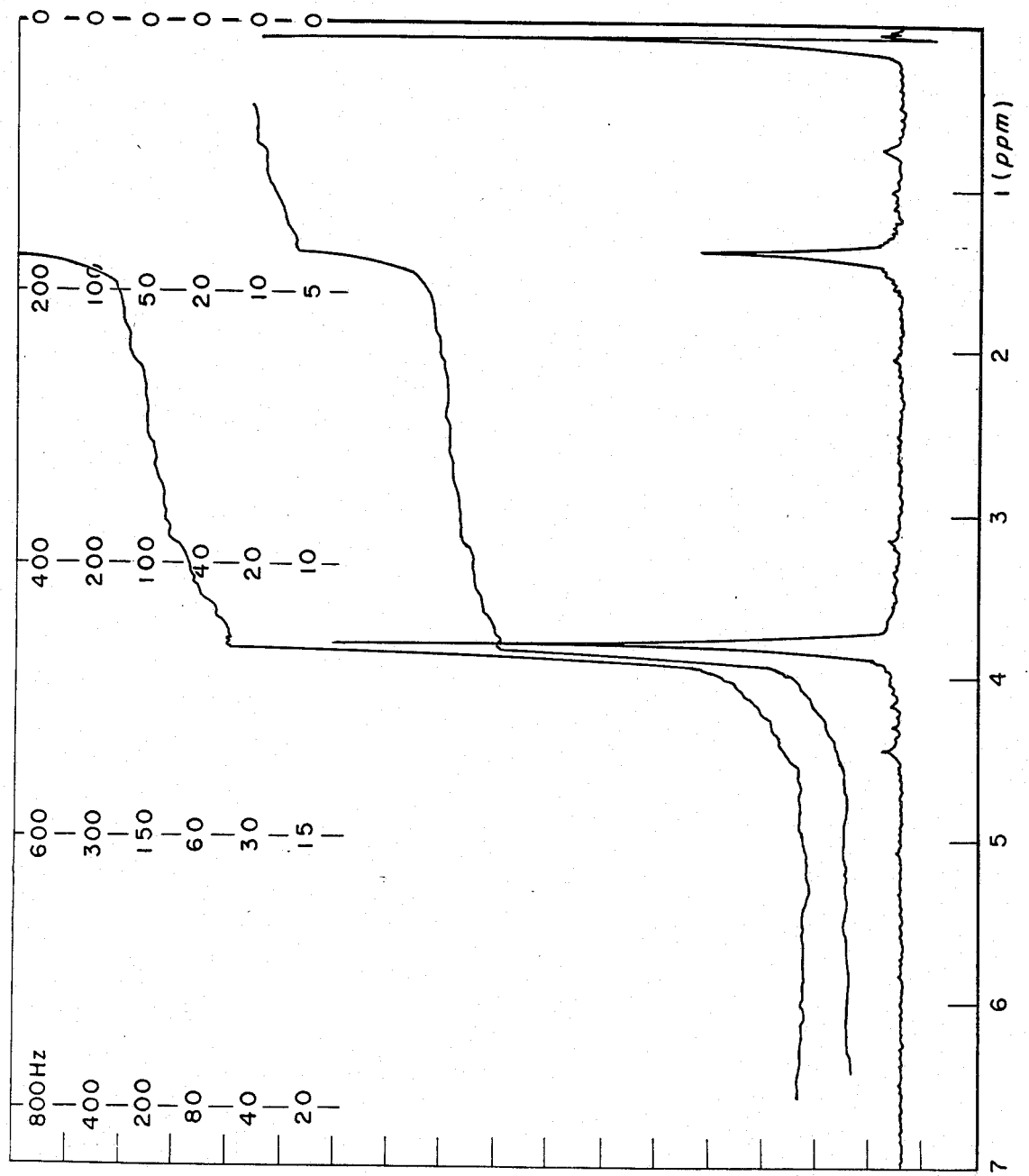
Figure 3:
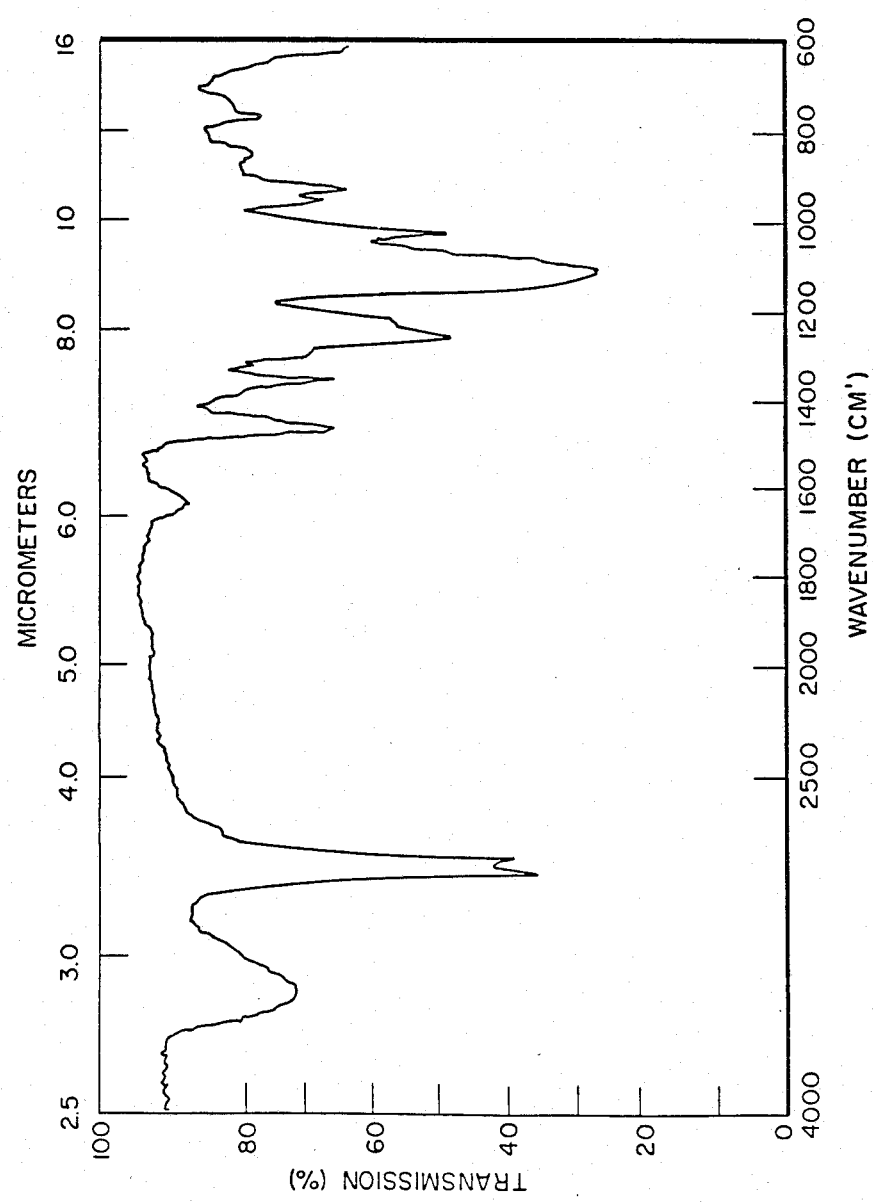

The NMR of FIG. 2 was performed on a Varian E-360 60 MHz proton NMR Spectrometer where the spectrum amplitude was 80, the filter was 0.1 sec., the RF power was 0.05 mg., the sweep time was 5 minutes, the sweep width was 10 ppm with an end of sweep at 0 ppm, and the nucleus was hydrogen, and the zero reference was tetramethylsilane (TMS) and with an ambient sample temperature and with $DCCl_3$ solvent.

The amount of antistatic agent is enough to provide both an antistatic effect and an effect in the reduction in chopper cling without resulting in matchsticking nor in detrimentally affecting weatherability. The amount of the organic quaternary ammonium antistat generally is at least an amount of around 0.05 weight percent of the aqueous treating composition. Too large an amount of the organic quaternary ammonium antistat leads to increased chopper cling and is therefore, detrimental rather than beneficial. Generally, the amount of the organic antistat is in the range of about 0.05 to about 0.4, and preferably around 0.05 to around 0.15 weight percent of the aqueous chemical treating composition for clear translucent panel production. Where filled panels are produced, the amount of the organic antistat can range up to the 0.3 or 0.4 weight percent amount.

The aqueous chemical treating composition is essentially free of any inorganic antistatic agents. Nonexclusive examples of such inorganic antistatic agnts are chromic chloride, alkali metal and alkaline earth metal chlorides such as lithium chloride and magnesium chloride which detrimentally affected weatherability.

When the choppability of the chemically treated glass fibers results in low static generation but a detrimental quantity of chopper cling, the aqueous chemical treating composition should also have a strand hardening agent. This material should reduce the cling without adversely causing matchsticking or lowering panel clarity. An effective amount of such a strand hardening agent increases strand integrity to decrease chopper cling. The strand integrity should not be increased to too great an extent, since this may result in increased matchsticking. Nonexclusive examples of a suitable strand hardener are self crosslinkable materials including aldehyde condensate polymers such as melamine formaldehyde, hexakis/methylol-containng condensates, monomers, dimers, trimers and higher oligomers, where for the phenol or resorcinol, compounds include cresol and mixtures of its isomers, xylenol or mixtures of its isomers, a mixture of homologs of phenol and dihydric phenols such as resorcinol, cresorcinol, and meta-xylorcinol can be used. The aldehyde includes any methylene donor that can be used in lieu of formaldehyde, for example, paraformaldehyde, hexamethylenetetramine, acid aldehyde, furfural and mixtures thereof. The aldehyde or methylol condensates can be used in conjunction with acid or basic catalyts. It is preferred to have one or more melamine formaldehyde resins because of their ease in crosslinking and their compatibility with the other polymers in the composition. A particularly suitable melamine formaldehyde resin is the aqueous melamine formaldehyde resin available from Monsanto Company under the trade designation Resimene 841 which has less than two percent free formaldehyde and less than 5 percent methanol and has a boiling point of 210° F. The Resimene 841 also has a vapor pressure of 95 for methanol and 17.5 for water, a vapor density of 1.11 for methanol and 0.64 for water, a colorless, clear mobile liquid appearance, specific gravity at 77° F. of 1.25 and a percent volatile by volume percent of 29. Another strand hardening agent that may be used is poly(vinyl pyrrolidone). The amount of the strand hardener is any amount equivalent to an amount of melamine formaldehyde resin like Resimene 841 material in the range of at least about 0.1 weight percent of the aqueous treating composition. An amount in excess of 0.5 weight percent of the aqueous chemical treating composition should not be used because of possible adverse effects on wettability. Preferably, the amount is in the range of around 0.1 to around 0.15 weight percent of the aqueous chemical treating composition. The amount of poly(vinyl pyrrolidone) used should not exceed 0.5 weight percent of the aqueous treating composition, since the poly(vinyl pyrrolidone) may reduce the wet-out characteristics of treated glass fibers and give the treated glass fibers an undesirable degree of hardness.

The aqueous chemical treating composition has a sufficient amount of water to give a total solids for the composition that is sufficient to enable the glass fibers to be treated during their formation with the aqueous chemical treating composition. Generally, the total solids of the aqueous composition is in the range of about 1 to about 30 weight percent and preferably about 3 to about 10 percent. In all events, the amounts of the solid components for an aqueous chemical treating composition should not exceed that amount which will cause the viscosity of the solution to be greater than about 100 centipoise at 20° C. Aqueous solutions having a viscosity of greater than 100 centipoise at 20° C. are very difficult to apply to glass fibers during their formation without breaking the fibers. It is preferred that the viscosity of the size be between 1 and 20 centipoise at 20° C. for best results. Chemical treating compositions with thixotropic gelling or foaming agents can have known viscosities for gels and foams used to treat glass fibers. The pH of the aqueous chemical treating composition is below about 7, and preferably should be in a range of about 4.8 to about 5.2 to maintain the stability of the composition. The aqueous chemical treating composition can be made by combining the components simultaneously or sequentially.

The aqueous chemical treating composition can be applied to any fiberizable glass material such as "E-glass", "621-glass" and low or free boron and/or fluorine derivatives thereof and glass fiber compositions known as "A-glass", "C-glass" and "S-glass". It is preferred when preparing chemically treated glass fibers to be used in the manufacture of clear or translucent polymeric panels that the fiberizable glass composition should result in glass fibers which give a blue hue or cast when they are used to reinforce the acrylic polyester matrix resins. Preferably, the glass fiber compositions give a refractive index for the glass fibers in the range of about 1.5495 to 1.5740. Higher refractive indicies for the glass give an undesirable bronze cast to clear panels reinforced with fibers. Most preferably the refractive index for the glass fibers is in the range of 1.5495 to 1.557.

The aqueous chemical treating composition can be applied to the glass fibers by any method known to those skilled in the art such as during the formation of the glass fibers after the glass fibers have cooled to a sufficient temperature to allow the application of the aqueous chemical treating composition. The aqueous chemical treating composition, typically referred to as a sizing composition, is applied to these glass fibers by applicators having belts, rollers, sprays and the like. The treated glass fibers then can be gathered into one or more strands and collected into a package commonly referred to as a forming package. Also, the glass fibers can be collected into one or more strands and chopped as a wet chopped product. Also, the glass fibers can be gathered into one or more strands and collected as a roving. The glass fibers are dried to reduce their moisture content, and preferably whatever the form of the chemically treated glass fibers, they are dried at temperature and time conditions equivalent to a temperature in the range of about 250° F. (121° C.) to less than 300° F. (149° C.) for 11 hours. The drying can be accomplished in any conventional glass fiber drying oven such as forced air ovens, dielectric ovens, and the like. The dried glass fibers have a dried residue of the aqueous chemical treating composition present on the surfaces of the glass fibers making up the strands. Preferably, the amount of the dried residue on the glass fibers is in the range of about 0.5 to about 1.2 weight percent LOI (loss on ignition).

The dried glass fibers having the residue of the aqueous chemical treating composition can be used in any process for producing polymeric reinforced polymers such as saturated and unsaturated polyesters and epoxies. One process in which the glass fibers are particularly suitable is the formation of clear or translucent acrylic polymer glass fiber reinforced panels. With the high speed commercial operations used in producing glass fiber reinforced clear and translucent panels, the glass fibers with the dried residue of the aqueous chemical treating composition of the present invention is ideally suited. The glass fibers when chopped have very good wet-out in the polymeric matrix within the limitations of the high speed operation for producing the panels. The glass fibers with the dried residue of the aqueous chemical treating composition can be supplied to such an operation as dry chopped glass fiber strand or as roving which is then chopped into the polymeric matrix which is traveling on a conveyor belt on a releasable substrate such as cellophane. The chopped glass fiber strands are dispersed somewhat uniformly over the polymeric matrix and the glass fibers settle and become wet-out in the polymeric matrix. The glass fiber containing polymeric matrix is then cured in a suitable oven to produce the glass fiber reinforced panels. The panels have good clarity with little fiber prominence. The treated glass fibers of the present invention can be used in translucent, unfilled panel systems and also in filled systems such as those having about 12 to around 50 weight percent calcium carbonate filled, pigmented filled and other filled and unfilled polymeric matrix systems.

In the preferred embodiment of the present invention, glass fibers are attenuated from molten batch and have a refractive index in the range of about 1.554 to 1.557 and have $B_2O_3$ concentration of around 5.2 percent by weight. The glass composition of the glass fibers is preferably in weight percent: $SiO_2$ —55.8, CaO—21, $Al_2O_3$ —14.8, $B_2O_3$ —5.2, $Na_2O$—1.4 and $F_2$ —0.5, along with trace amounts of materials usually present from batch compounds used to obtain the aforementioned components of the glass. The glass fibers are coated with the aqueous chemical treating composition during the formation of the glass fibers from a multitude of orifices in a bushing of a glass-melting furnace by a belt type binder applicator.

The aqueous chemical treating composition has a single aqueous emulsion having bisphenol polyester film forming polymer available from Savid under the trade designation Neoxil ® 954 as the sole polymeric material for film formation. The bisphenol polyester or esterified epoxy film forming polymer has an amount of aliphatic unsaturation of less than 1.4 double bonds/mole of polymer and has a ratio of aliphatic unsaturation to aromatic unsaturation which is preferably less than 0.1 and which is most preferably around 0.07. The preferred silane coupling agent is the gamma methacryloxypropyltrimethoxy silane available from Union Carbide Corporation under the trade designation A174 silane, and the amount of the A174 silane is preferably in the range of about 2.7 to about 5 weight percent of the solids of the aqueous chemical treating composition. The water soluble cationic glass fiber lubricant is preferably the Emerylube ® 6717, which is present in an amount of about 1 to 2.5 weight percent of the solids of the aqueous chemical treating composition. The antistatic organic agent that is cationic quaternary ammonium salt with ethoxylation is the Neoxil ® AO-5620 antistat which is present as the sole antistat used in an effective amount of about 0.05 to about 0.15 weight percent of the aqueous treating composition. Also it is preferred to have present a strand hardening agent which is Resimene 841 melamine formaldehyde in an amount of around 0.1 to around 0.15 weight percent of the aqueous treating composition. The water which is present to make up the aqueous chemical treating composition is that amount to give a total solids preferably around 5 to 6 weight percent of the aqueous chemical treating composition. The amount of the bisphenol polyester resin is the remainder of the solids from the amounts of the coupling agent, lubricant, antistat and strand hardener. The pH of the aqueous chemical treating composition is preferably in the range of about 5.5 to about 6.2.

The aqueous chemical treating composition is prepared by hydrolyzing methacryloxypropyltrimethoxy silane with acetic acid in an amount of about 1 milliliter of acetic acid for about 20 grams of the silane in a premix tank. The hydrolyzation is performed by adding the acetic acid to about 10 to 20 weight percent of the water to be used in preparing the chemical treating composition and adding the silane to this mixture with stirring until complete hydrolyzation occurs. The cationic glass fiber lubricant is added to hot water 170° F. (76.7° C.) with stirring where the amount of water is about 1 percent of the total amount of water used in preparing the aqueous chemical treating composition in a premix tank. The aqueous emulsion of the bisphenol polyester as about 46 Percent solids is combined with about twice its weight of water in a main mix tank. The hydrolyzed silane and glass fiber lubricant are added to the main mix tank. The cationic organic ethoxylated quaternary ammonium salt antistatic agent is combined with warm water in about a 1 to 16 ratio and added to the main mix tank. Any melamine formaldehyde resin is combined with water in a ratio of about 1 to 300 and added to the main mix tank. A small amount of antifoaming agent like SAG 10 can be added and the mix which has been agitated is diluted to the final desired volume with water. The final pH of the aqueous chemical treating composition is then adjusted to be in the range of about 5.5 to about 6.2 with a compatible organic acid such as acetic acid.

Preferably, the aqueous chemical treating composition is applied to green glass having a refractive index of about 1.555 during the formation of the glass fibers where the fibers have a diameter which can range from about $10.3 \times 10^{-5}$ to about $97.5 \times 10^{-5}$ or more inch and preferably is around 35 to $40 \times 10^{-5}$ inch. The aqueous chemical treating composition is applied to the glass fibers to give an add-on of the chemical treating composition in the range of about 0.5 to about 8 percent LOI (Loss on Ignition). The glass fibers are preferably G, H or K fibers gathered into strands to give constructions like G-67 (or H-55 or K-37) strand or the like. The strands of glass fibers are collected on a winder to produce a roving package and a plurality of the roving Packages are dried in a Michigan oven at a temperature in the range of about 220° to 300° F. (104°–149° C.) for 11 hours. The roving can then be used in a process for producing clear or translucent acrylic polyester or epoxy panels by chopping the roving into chopped strand having a length of about 1/16 of an inch to 2 inches, preferably 1 inch. The chopped strands fall into the matrix resin which is present on a moving conveyor with a release substrate such as cellophane separating the matrix from the conveyor belt. The chopped glass fiber strand containing matrix resin is conveyed to an oven where the panels are heated to cure.

The invention and preferred embodiment are further illustrated by the following examples.

EXAMPLE I

A 50 gallon (189.27 liter) aqueous chemical treating composition was prepared with the components of Table I. The composition was used to treat glass fibers as described in the preferred embodiment.

TABLE I

| Component | Wt. in grams | Wt % Solids | Weight % of Aqueous Treating Composition |
|---|---|---|---|
| Gamma-methacryloxypropyl-triethoxy silane | 380 | 2.7 | 0.16 |
| Acetic acid | 25 | — | 0.01 |
| Water for silane | 22720 | — | — |
| Cationic glass fiber lubricant (Emery ® 6717 lubricant) | 151.5 | 1.4 | 0.08 |
| Water for lubricant | 1895 | — | — |
| Aqueous emulsion of bisphenol A type polyester polymer (Neoxil ® 954 resin) | 22,720 | 93.2 | 5.5 |
| Organic quaternary ammonium antistat (Neoxil ® AO-5620) | 284 | 2.5 | 0.15 |
| Water to result in volume of 50 gallons | — | — | — |

The glass fibers had the glass composition of the preferred embodiment and had filament diameters of H or K and were constructed into glass fiber strands having a construction of H-55 or K-37 which were dried at the temperatures of the preferred embodiment. The dried strands were chopped into lengths of about 2.54 cm. These dried chopped glass fiber strands were added to an acrylic polyester matrix by the aforedescribed process to produce translucent panels.

Table 1 shows the amount of aliphatic unsaturation, ratio of aliphatic unsaturation to aromatic unsaturation and molecular weight averages for the aqueous emulsion of the esterified epoxy film forming polymer Neoxil ® 954 material in Dowanol solvent and the resulting wettability of the glass fibers in polyester thermoplastic matrix.

TABLE 1

| Aqueous emulsion of esterified epoxy film forming polymer (Neoxil ® 954) | Ratio of aliphatic unsaturated to aromatic unsaturation 1st sample/2nd sample | Amount of aliphatic unsaturation double bonds/mole of polymer | Molecular Weight Average gms/mole | | Wettability in Average |
|---|---|---|---|---|---|
| Example 1 | 0.0694/0.0713 | — | 20.6 | 31.0 | Good |
| Illustrative Example 1 | 0.1172/0.1146 | 1.55 | 25.3 | 36.3 | Bad |
| Example 3 | 0.0648/0.0720 | 1.14 | 22.1 | 37.5 | Good |
| Illustrative Example 2 | 0.0918/0.1022 | — | 23.9 | 37.4 | Bad |
| Example 5 | 0.0694/0.0713 | 1.14 | 24.6 | 37.9 | Good |
| Example 6 | 0.0710/0.0592 | — | 24.1 | 37.1 | Good |
| Example 7 | 0.09/0.1 | 1.33 | 28.1 | 42.3 | Marginally Good |
| Example 8 | 0.0650/0.0770 | 1.28 | — | — | Good |

The amount of aliphatic unsaturation can be determined by any method that is well known to those skilled in the art. The values are percentages related to carbon-to-carbon double bonds based on 100 parts of solid resin.

The ratio of aliphatic to aromatic unsaturation was determined at the following wavelengths and in accordance with the following calculation:

Absorbance at wavelength $X$ = (maximum peak value) − (sum of 2 minimum values for peak divided by 2)

Example 5 from Table 1

ABSORBANCE AT 1647 CM$^{-1}$ = .0260 −

$$\frac{.0209 + .0194}{2} = .0058$$

ABSORBANCE AT 1608 CM$^{-1}$ = .1045 −

$$\frac{.0269 + .0194}{2} = .0813$$

$$\frac{A\text{-}1647 \text{ CM}^{-1}}{A\text{-}1608 \text{ CM}^{-1}} = \frac{.0058}{.0813} = .0713$$

The molecular weight averages were determined by gel permeation chromatography.

The wettability was determined by visually observing the time for disappearance of the strand chopped onto polymer matrix in a panel roving line. When the chopped strand wetted out in up to 3 minutes, it was noted as "Good" and when it wetted out in 5 to 6 minutes, it was noted as "Bad". Various dried strands having glass fibers treated with the different film forming polymers of Table 1, where each was present in an aqueous sizing composition as in Example I were comparatively tested for wettability.

With the amount of aliphatic unsaturation and the ratio of the aliphatic to aromatic unsaturation given in Table 1 for the film forming polymer, fast wettability could be obtained. The fast wettability was of the chopped chemically treated glass fiber strands in the matrix polymer. With a value of aliphatic unsaturation over 1.5 double bonds/mole of polymer and a ratio of aliphatic to aromatic unsaturation of more than 0.1, the wettability was bad.

I claim:

1. A method of controlling the wettability of glass fibers in polyester matrices, wherein the glass fibers have a dried residue of an aqueous chemical treating composition having an aqueous emulsion of a thermoplastic film forming polymer having polar functionality, lubricant and coupling agent, comprising:
   a. formulating the aqueous chemical treating composition with nonaqueous components that have an amount of unsaturation of less than an average of 1.5 aliphatic double bonds per mole of each nonaqueous component and that result in a ratio of aliphatic unsaturation to aromatic unsaturation of not greater than around 0.1 as measured by IR absorptivity in film dried at room temperature where each component has less than an average of 1.5 aliphatic double bonds per mole for faster wetting of the glass fibers in the polymeric matrix and with higher values of the amount of unsaturation and of the ratio for progressively decreasing degrees of wettabillity, and to have less than one weight percent based on the aqueous composition of any chain extension inducing or condensation inducing reatants,
   b. treating glass fibers with the aqueous chemical treating composition,
   c. collecting the glass fibers as strands, drying the glass fiber strands at a temperature to discourage any crosslinking reactions.

2. Method of claim 1, wherein the aqueous chemical treating composition is essentially free of chain extension inducing and condensation inducing reactants.

3. Method of claim 1, wherein the ratio of aliphatic unsaturation to aromatic unsaturation is less than 0.09.

4. Method of claim 1, wherein the ratio of the aliphatic unsaturation to the aromatic unsaturation is less than 0.07.

5. Method of claim 1, wherein aqueous chemical treating composition has a thermoplastic film forming polymer with polar functionality in the aqueous chemical treating composition that is an epoxidized polyester or an esterified epoxy film forming polymer.

6. Method of claim 1, wherein the aqueous chemical treating composition is essentially free of condensation inducing reactants, selected from the group consiting of materials present with the following moieties: carboxylic acid and amine, epoxy and amines, alcohols and carboxylic acid, and isocyanate and epoxy.

7. Method of claim 1, wherein the aqueous chemical treating composition has a thermoplastic film forming polymer that is selected from the group consisting of epoxy epoxidized polyvinylacetate copolymers.

8. Method of claim 1, wherein the aqueous chemical treating composition has an aqueous emulsion of a thermoplastic film forming polymer, lubricant and organo silane coupling agent where each component has a ratio of aliphatic unsaturation to aromatic unsaturation of less than around 0.1 and less than an average of 1.5 aliphatic double bonds/mole.

9. Wettable glass fibers from the method of claim 1.

10. The method of claim 1, wherein the thermoplastic polymer selected from the group consisting of epoxidized polyester and esterified epoxy film forming polymers is the sole film forming polymer in the aqueous chemical treating composition.

* * * * *